Oct. 8, 1935.   D. S. BRUCE   2,016,983
DEVICE FOR UNDERGROUND WATERING AND FERTILIZING
Filed Oct. 19, 1934   2 Sheets-Sheet 1
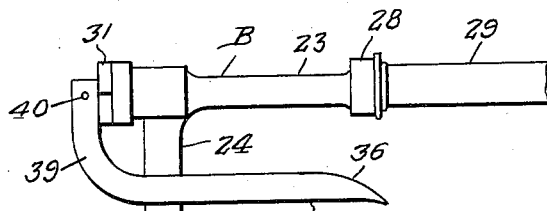
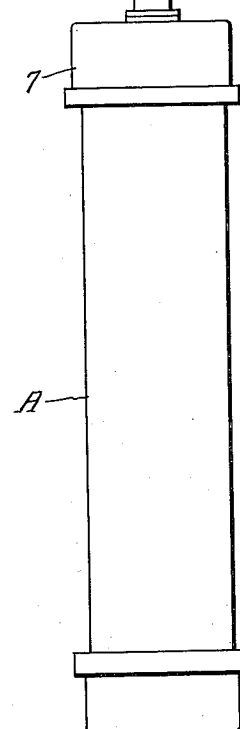
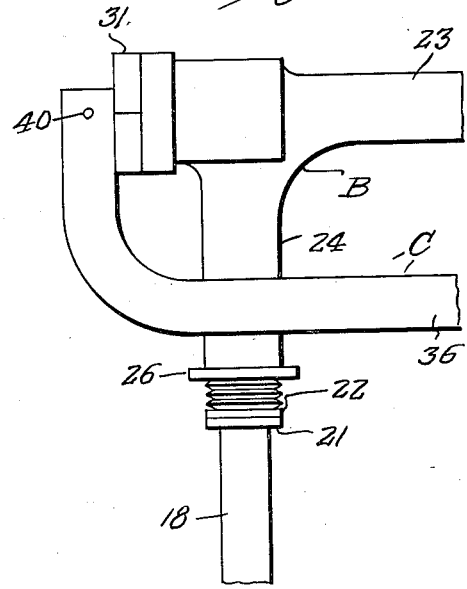
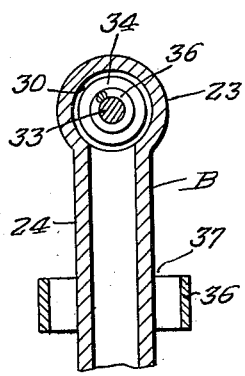
Inventor
*D. S. Bruce,*
By *Clarence A. O'Brien*
Attorney

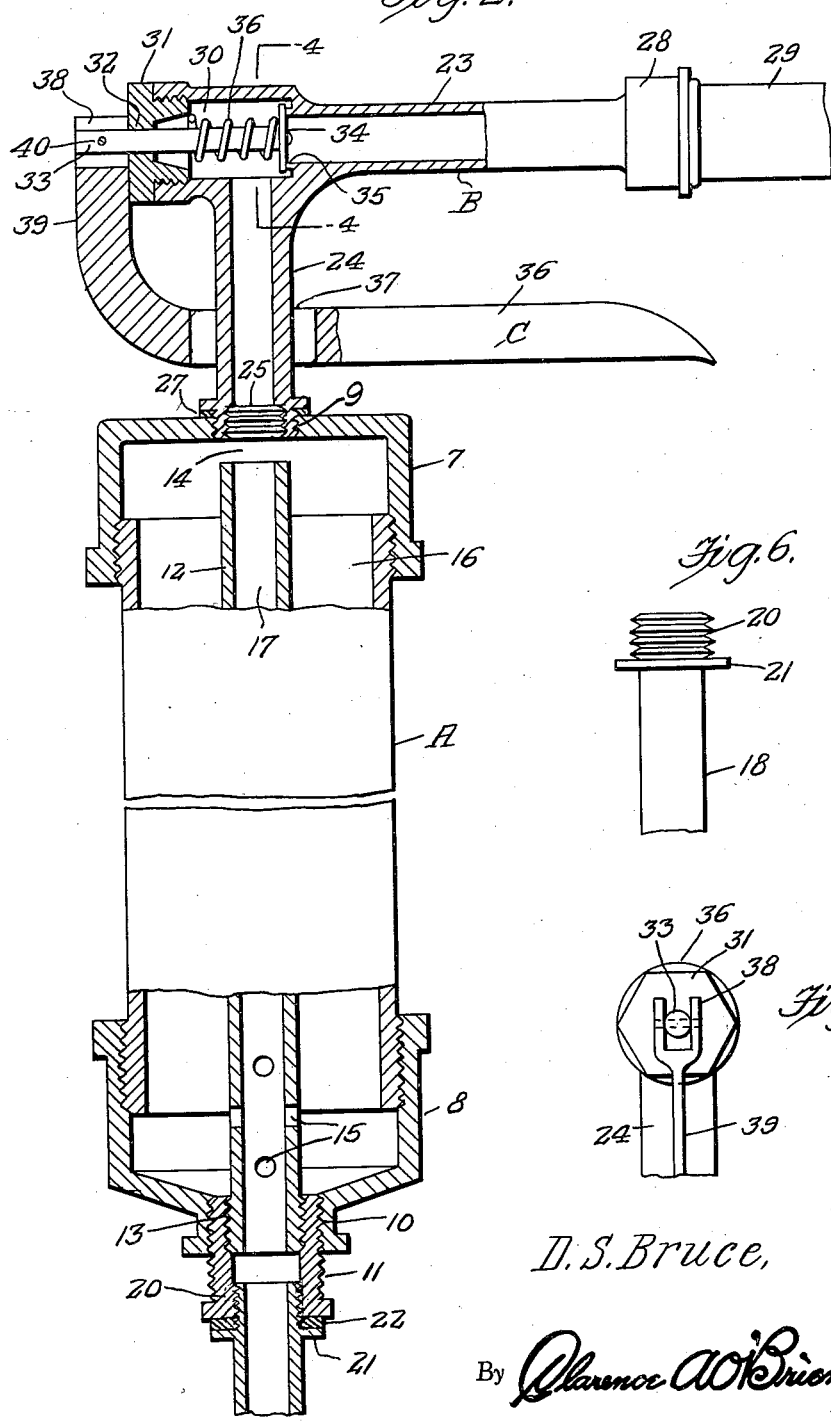

Patented Oct. 8, 1935

2,016,983

UNITED STATES PATENT OFFICE 2,016,983

DEVICE FOR UNDERGROUND WATERING AND FERTILIZING

Dayton S. Bruce, Amarillo, Tex.

Application October 19, 1934, Serial No. 749,112

7 Claims. (Cl. 47—49)

This invention relates to a device for underground watering and fertilizing.

The primary objective of the invention is an apparatus to facilitate the work of fertilizing trees, shrubbery, flowers and other vegetation by utilizing water pressure from the city mains to apply powdered commercial fertilizer underground to the roots of the vegetation, or at other shallow depths below the surface of the earth thereby obviating the necessity of digging numerous holes to retain the fertilizer.

Another salient feature of the invention is to provide twin mixing chambers arranged to furnish a circuitous path through the chambers to insure a thorough mixture of the fertilizer with the water and at the same time utilizing the outer chamber for retaining the fertilizer.

Further objects of the invention are to provide a device of the character referred to that is strong, compact and durable, very easy to assemble and maintain in repair, that is comparatively inexpensive to manufacture and thoroughly reliable for its intended use.

With the foregoing and other objects in view the invention consists of a novel construction, combination and arrangement of parts as will hereinafter be more specifically described and illustrated in the accompanying drawings and specification, but it is to be understood that various modifications may be resorted to without departing from the spirit of the claims hereunto appended.

In the drawings; wherein for the purpose of illustration is shown the preferred embodiment of the invention, and wherein like reference characters denote corresponding parts throughout the several views:—

Figure 1 is an elevation of the device constructed in accordance with the present invention, Figure 2 is an enlarged elevation of Figure 1 showing parts broken away, which broken portions are revealed in detailed vertical section, Figure 3 is an enlarged fragmentary elevation illustrating how the present invention may be utilized for watering purposes alone, Figure 4 is a detailed vertical section taken substantially on line 4—4 of Figure 2, Figure 5 is a rear elevation of the valve, Figure 6 is an enlarged elevation of the inner end of the ground piercing tube.

Referring to the drawings in detail, A indicates a cylindrical casing externally threaded at each end to receive the closure caps 7, 8. Extending through the center of the upper closure cap 7 is a threaded opening 9 which forms the inlet to the interior of the cylinder. In the lower cap 8 there is a threaded outlet opening 10 in alignment with the inlet opening 9. Inlet and outlet openings are disposed along the axis of the cylinder A.

There is a bushing 11 mounted in the threaded outlet opening 10, which bushing is formed with interior and exterior threads. An inner sleeve 12 is mounted within the cylinder A by having threads 13 on the lower end thereof engaging in a portion of the interior of the bushing 11. The upper end of sleeve 12 is spaced from the top of the cylinder A, which space provides the passage 14, while the lower end of the tube is formed with spaced openings that form the passage 15.

The sleeve 12 divides the interior of cylinder A into outer mixing chamber 16 and inner mixing chamber 17, while the passages 14 and 15 form a communication between the chambers on the opposite sides of the middle of the sleeve thereby providing a circuitous path for the fluid that performs the mixing operation. It is pointed out that the inlet opening 9, the outlet opening 10 and the axis of the sleeve 17 are in alignment. An earth piercing tube 18 is formed with a point 19 on its free end. The upper end of the earth piercing tube is threaded as at 20 and sub-joining the thread is an outset annular shoulder 21. The upper threaded end 20 of the tube 18 is connected with the lower portion of the bushing 11 having the washer 22 clamped between shoulder 21 and the end of the bushing to provide a fluid tight connection. The earth piercing tube 18 is also in alignment with the axis of cylinder A and the sleeve 12.

Connected with the top of the cylinder is an L-shaped fitting B including the horizontal tubular arm 23 and the tubular, vertical arm 24. The lower end of the vertical arm 24 is internally threaded as at 25 and externally threaded, which external thread is connected with the threaded inlet opening 9. Above the external thread on the lower end of arm 24 is a shoulder 26 which clamps the washer 27 to the top of the cap 7 to form a fluid tight joint. On the outer end of the arm 23 there is a hose fitting 28 to receive the nose 29 that leads from the water service main having the customary pressure used in municipal water systems. When the device is used on the farm hose 29 may be connected to the house supply water service of individual pumping systems.

At the juncture between tubular arm 23 and tubular arm 24 there is an enlarged valve chamber or pocket 30, the outer end of which is closed by a gland packing nut 31 formed with a central opening 32. A valve plunger rod 33 extends through the opening 32 and into the valve chamber 30. Secured to the inner end of the valve plunger 33 is a disk valve 34, which in closed position abuts against the valve seat 35. A spiral spring 36 encircles the inner end of the plunger 33 having one end abutting the valve disk 34 and the other end bearing against the inside of gland nut 31. The tension on the coil spring 36 is sufficient to hold the valve 34 closed against the pressure of ordinary water mains used on farms and in cities. To operate the valve plunger 33 there is a right angled lever C having a horizontal leg 36 slidably arranged on the exterior of the vertical arm 24. Arm 24 extends through the circular opening 37. Lever C is formed with spaced ears 38 on the free ends of the other leg 39 between which ears is pivotally connected on the pin 40 the outer end of the plunger 33. Thus it will be seen that to open the valve 34 lever C is moved upwardly imparting rocking movement to lever C which moves plunger 33 outwardly and opens the valve 34 thereby permitting water to pass into the interior of cylinder A.

In the construction of my device I may utilize it for sub-irrigation work by merely removing the cylinder A and connecting the threaded upper end 20 of the rigid earth piercing tube 18 to the threaded lower end 25 of the arm 24. In this latter event the earth is pierced first by the point 19 and using the water pressure together with the weight of the device it is an easy operation to sink tube 18 in the earth to the desired depth. The sub-irrigation feature described herein is shown in the assembled relation particularly in Figure 3 of the drawings wherein the cylinder A has been removed and the rigid earth piercing tube connecting directly to the vertical arm 24.

When using the device for a hydraulic fertilizer distributor, the cap 7 is removed from cylinder A and the fertilizer inserted in outer chamber 16. Then the cap is placed on the cylinder and the water supply opened. The water will enter the cylinder through tubular arm 24, pass through the passages 15 and the passage 14 in a circuitous path contacting the fertilizer in the lower end of cylinder A and carrying the same in dissolved state or in suspension through the rigid earth piercing tube 18 into the ground. Part of the water flows through sleeve 12 and part of it goes into the chamber 16 where it mixes with the fertilizer. As the water flows from chamber 16 into chamber 17 through passages 14, and 15 it is mixed the second time in chamber 17 because the path of the water entering chamber 17 is at right angles to the flow through sleeve 12. As soon as the chamber fills with water the pressure exerted causes a flow both through the passage 14 and the passages 15, which being at right angles to the path through chamber 17 causes a circuitous course for the water that accomplishes a thorough mixture.

Having described my invention, what I claim is:

1. A hydraulic fertilizer distributor comprising an outer cylinder having an opening at each end, a sleeve within the cylinder dividing the same into an inner and outer mixing chamber, said sleeve provided with a free unimpeded passage on the opposite sides of the middle thereof forming a communication between the inner and outer chambers, a valve controlled inlet connected to one end of the outer cylinder, and an earth piercing tube connected to the other end of the outer cylinder.

2. A hydraulic fertilizer distributor comprising an outer cylinder having an opening at each end, a sleeve within the cylinder dividing the same into an inner and outer mixing chamber, said sleeve provided with a free unimpeded passage on the opposite sides of the middle thereof forming a communication between the inner and outer chambers, a valve controlled inlet connected to one end of the outer cylinder, a rigid earth piercing tube connected to the other end of the outer cylinder, and the sleeve disposed along the axis of the outer cylinder.

3. A hydraulic fertilizer distributor comprising an outer cylinder having an opening at each end, a sleeve within the cylinder dividing the same into an inner and outer mixing chamber, said sleeve provided with a free unimpeded passage on the opposite sides of the middle thereof forming a communication between the inner and outer chambers, a valve controlled inlet connected to one end of the outer cylinder, a rigid earth piercing tube connected to the other end of the outer cylinder, the sleeve disposed along the axis of the outer cylinder, and the axis of the sleeve being in alignment with the inlet and the earth piercing tube.

4. A hydraulic fertilizer distributor comprising an outer cylinder having an opening at each end, a sleeve within the cylinder dividing the same into an inner and outer mixing chamber, said sleeve provided with a free unimpeded passage on the opposite sides of the middle thereof forming a communication between the inner and outer chambers, a valve controlled inlet connected to one end of the outer cylinder, a rigid earth piercing tube connected to the other end of the outer cylinder, the sleeve disposed along the axis of the outer cylinder, the axis of the sleeve being in alignment with the inlet and the earth piercing tube, and the passages between the inner and outer mixing chambers being at right angles to the fluid path thereby forming a circuitous course through the mixing chambers.

5. An irrigating device comprising an L-shaped head constituting a horizontal and a vertical arm, a hose connection on the free end of the horizontal arm, an earth piercing member connected to the free end of the vertical arm, said head formed with a valve chamber at the juncture of the horizontal and the vertical arms, a valve mounted in the valve chamber, and a valve operating handle connected with the valve and having a portion thereof embracing the vertical arm of the head.

6. A hydraulic fertilizer distributor comprising a cylinder closed at each end by a removable cap, said caps each formed with threaded openings, a bushing mounted in the lower threaded opening, a sleeve carried by the bushing and extending into the cylinder terminating in spaced relation to the top of the cylinder to provide an upper passage between the cylinder and the inside of the tube, said sleeve formed with openings adjacent the bottom of the sleeve to provide a lower passage between the cylinder and sleeve, an earth piercing tube carried by the bushing, and a valve controlled inlet connected to the threaded opening in the other cap.

7. A hydraulic fertilizer distributor comprising a cylinder closed at each end by a removable cap, said caps each formed with threaded openings, a bushing mounted in the lower threaded opening, a sleeve carried by the bushing and extending into the cylinder terminating in spaced relation to the top of the cylinder to provide an upper passage between the cylinder and the inside of the tube, said sleeve formed with openings adjacent the bottom of the sleeve to provide a lower passage between the cylinder and sleeve, an earth piercing tube carried by the bushing, an inlet conductor, valve means in the inlet conductor including a plunger, and an operating handle connected at one end to the plunger and another portion thereof embracing the inlet conductor.

DAYTON S. BRUCE.